(12) United States Patent
Hauser

(10) Patent No.: US 8,221,041 B2
(45) Date of Patent: Jul. 17, 2012

(54) FIXING DEVICE

(75) Inventor: Ingo Hauser, Kandern (DE)

(73) Assignee: A. Raymond et Cie, Grenoble (FR)

( * ) Notice: Subject to any disclaimer, the term of this patent is extended or adjusted under 35 U.S.C. 154(b) by 977 days.

(21) Appl. No.: 12/160,329

(22) PCT Filed: Mar. 8, 2007

(86) PCT No.: PCT/EP2007/001991
§ 371 (c)(1),
(2), (4) Date: Jul. 9, 2008

(87) PCT Pub. No.: WO2007/104463
PCT Pub. Date: Sep. 20, 2007

(65) Prior Publication Data
US 2010/0272541 A1    Oct. 28, 2010

(51) Int. Cl.
*F16B 21/04*    (2006.01)
(52) U.S. Cl. ........................................ 411/349; 411/508
(58) Field of Classification Search ............... 411/349, 411/549, 45, 46, 47, 48, 508, 509, 510, 913; 24/297, 458, 663, 581.11; 292/58, 59, 65
See application file for complete search history.

(56) References Cited

U.S. PATENT DOCUMENTS

| | | | | |
|---|---|---|---|---|
| 2,688,894 A | * | 9/1954 | Modrey | 411/34 |
| 4,391,461 A | * | 7/1983 | Deibele | 292/204 |
| 4,762,437 A | | 8/1988 | Mitomi | |
| 5,142,834 A | * | 9/1992 | Laclave et al. | 52/208 |
| 6,435,790 B1 | * | 8/2002 | Ichikawa | 411/349 |
| 6,474,921 B1 | * | 11/2002 | Gordon | 411/508 |
| 7,753,634 B2 | * | 7/2010 | Nakazato | 411/553 |
| 7,955,038 B2 | * | 6/2011 | Silbereisen et al. | 411/552 |
| 2002/0021950 A1 | * | 2/2002 | Ichikawa | 411/349 |
| 2006/0042053 A1 | * | 3/2006 | Kawai | 24/297 |

FOREIGN PATENT DOCUMENTS

DE    9311243 U1    9/1993
* cited by examiner

*Primary Examiner* — Flemming Saether
(74) *Attorney, Agent, or Firm* — Faegre Baker Daniels (57) ABSTRACT

A fastening arrangement includes a locking part having a head plate and a foot shaft configured with catch noses, bearing tenons, and spring webs having catch noses and web wings. The receiving element includes a profiled surface and an edge wall including inwardly convex portions and outwardly concave portions. When the locking part is in a mounted position, the bearing tenons are disposed in first depressions while the spring webs are in a rear engagement position in which the catch noses engage behind an element. When the locking part is in a demounted position, the bearing tenons are disposed in second depressions and the spring webs are in a released position in which they are out of engagement with the element.

9 Claims, 7 Drawing Sheets

FIXING DEVICE

CROSS REFERENCE TO RELATED APPLICATION

This application is a U.S. National Phase Patent Application based on International Application Serial No. PCT/EP2007/001991 filed Mar. 8, 2007, the disclosure of which is hereby explicitly incorporated by reference herein.

BACKGROUND OF THE INVENTION

1. Field of the Invention

The present invention concerns a fastening arrangement.

2. Description of the Related Art

One fastening arrangement is known from DE 93 11 243 U1. The prior fastening arrangement for interconnecting two elements comprises a rotatable locking part having a head plate that comes to rest against a first element, and a foot shaft, which is joined to the head plate and extends away from it in the axial direction. Formed on the foot shaft are radially outwardly extending catch noses configured to engage behind a second element. The prior fastening arrangement further comprises, configured on the first element, a receiving element for the locking part. The prior fastening arrangement also includes a spring element in the form of a helical spring, which surrounds the foot shaft and is disposed between the head plate and a floor wall of the receiving element. In a pre-mounted position, the catch noses engage behind the back side of the receiving element, i.e., the side facing the spring element, whereas in a final mounted position, in order to connect the first element, comprising the receiving element, to a second element, the locking part is rotated 90 degrees, further compressing the spring element, such that the catch noses then engage behind the second element.

SUMMARY OF THE INVENTION

The present invention provides a fastening arrangement by means of which the elements can be interconnected by mating and can be taken apart again in a very simple manner.

By virtue of the fact that in the inventive fastening arrangement, the catch noses are affixed to radially resilient spring webs, which as a result of the interaction of the web wings and the edge wall can be moved between a mounted position and a demounted position, these two positions being clearly defined by the engagement of the bearing tenon in depressions, in order to be interconnected the elements can be mated to one another by means of projecting catch noses that engage behind the second element after the interconnection is completed, whereas in order to separate the elements the locking part is rotated into the demounted position in which the catch noses are out of engagement with the second element, such that the elements can then be taken apart again.

In one form thereof, the present invention provides a fastening arrangement for interconnecting at least two elements and including a locking part having a head plate, which comes to rest against a first element, and a foot shaft, which is joined to the head plate and extends away from the head plate in the axial direction, and on which are formed radially outwardly extending catch noses provided to engage behind a second element, and further including, configured on the first element, a receiving element for the locking part, characterized in that resilient spring webs movable in a radial direction are configured on the foot shaft, each catch nose is disposed on an associated spring web, each spring web includes a radially outwardly extending web wing in a region adjacent the head plate, radially outwardly projecting bearing tenons are configured on the foot shaft, the receiving element is further configured to include an edge wall cooperating with the web wings and including inwardly convex portions that project inwardly in a radial direction and outwardly concave portions that recede outwardly in a radial direction, and to include a profiled surface that cooperates with the bearing tenons and is configured with depressions extending in the axial direction, wherein, in a mounted position of the locking part, the bearing tenons are disposed in ones of the first depressions and the spring webs are in a rear engagement position in which the catch noses are disposed to engage behind the second element, and wherein, in a demounted position of the locking part, the bearing tenons are disposed in the second depressions, and the spring webs, by virtue of the web wings being disposed in the inwardly convex portions of the edge wall, are in a released position in which the catch noses are in an arrangement such that they are shifted inwardly in relation to the rear-engagement position and are out of engagement with the second element.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

Figure 1:
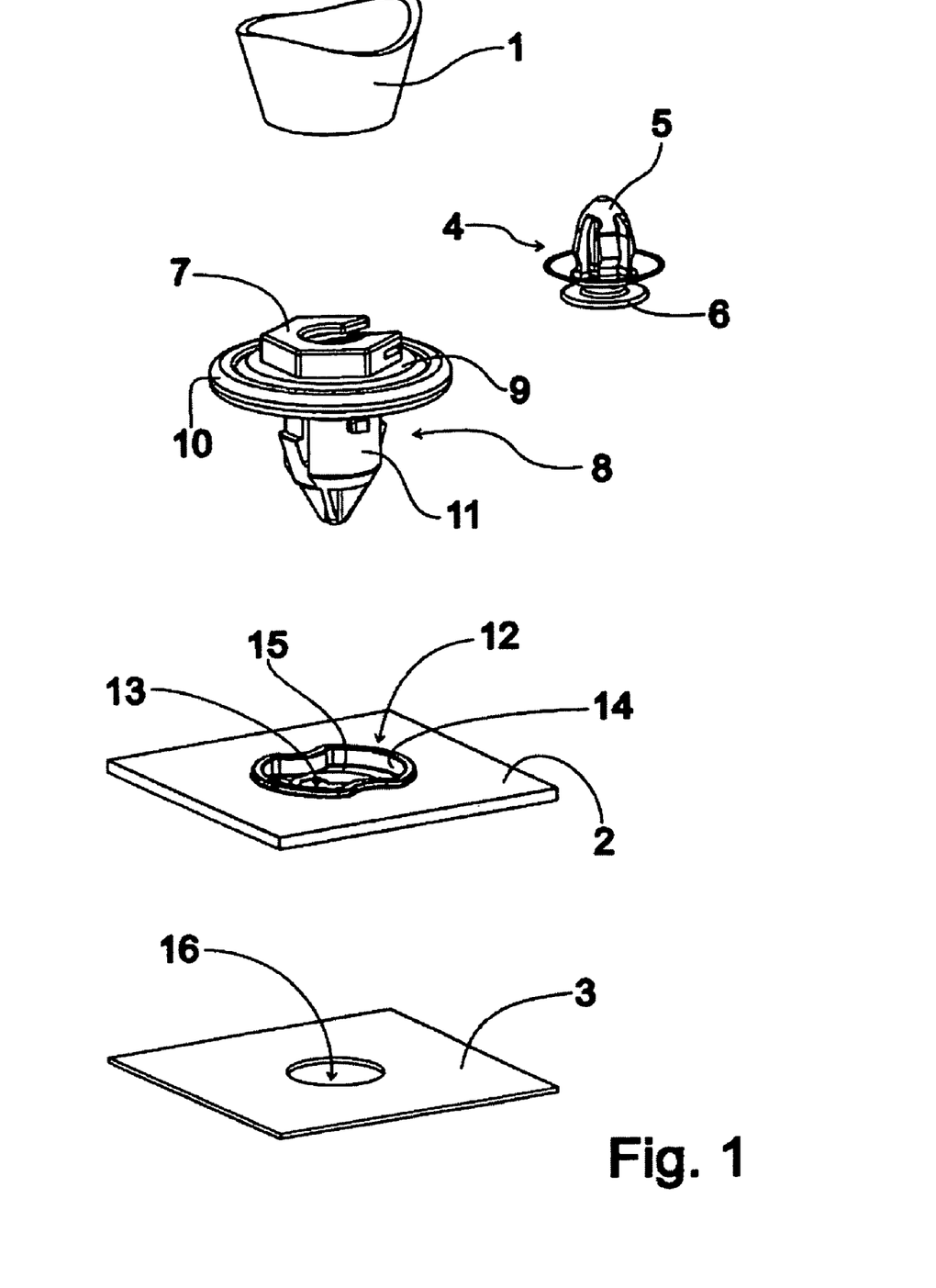
FIG. 1 is a perspective view of an exemplary embodiment of a fastening arrangement according to the invention for interconnecting a total of three elements.

FIG. 1 is a perspective view of an exemplary embodiment of a fastening arrangement according to the invention for interconnecting at least two elements, in which exemplary embodiment a liner element 1, for example a door liner for a motor vehicle, an add-on part 2 and a carrier part 3, configured for example as a sheet-metal door panel, are to be interconnected. The exemplary fastening arrangement according to the invention illustrated in FIG. 1 is provided with a liner retaining element 4 known per se, which can be connected to the liner element 1 via a fastening foot 5. Liner retaining element 4 further comprises, disposed oppositely from the fastening foot 5, a fastening head 6 that can be connected to a receiving head 7 belonging to a locking part 8 of the inventive fastening arrangement and made of a hard elastic synthetic material. Receiving head 7 in the exemplary embodiment is configured as hexagonal, so that, for example, it can be brought into form-locking engagement with a hexagonal wrench.

Locking part 8 further comprises a disk-like head plate 9, which is surrounded edgewise by a sealing lip 10 made of a soft elastic material. On the opposite side of head plate 9 from receiving head 7, locking part 8 is equipped with a foot shaft 11 that extends away from head plate 9 in the axial direction.

It can further be seen from FIG. 1 that add-on part 2 is configured with a receiving element 12, which is designed to receive the inventive fastening arrangement and which includes an add-on part opening 13 through which the foot shaft 11 can be guided until head plate 9 rests against the side of add-on part 2 facing toward locking part 8. Receiving element 12 further comprises a circumambient edge wall 14, which is disposed at a distance from the edge of add-on part opening 13. A bearing surface 15 oriented substantially parallel to add-on part 2 is configured in receiving element 12 between edge wall 14 and the edge of add-on part opening 13.

Finally, it can be seen from FIG. 1 that carrier part 3 is configured with a substantially circular carrier part opening 16, which is so dimensioned that foot shaft 11 can also be guided through carrier-part opening 16 to interconnect elements 1, 2, 3 in a manner explained in more detail below.

Figure 2:
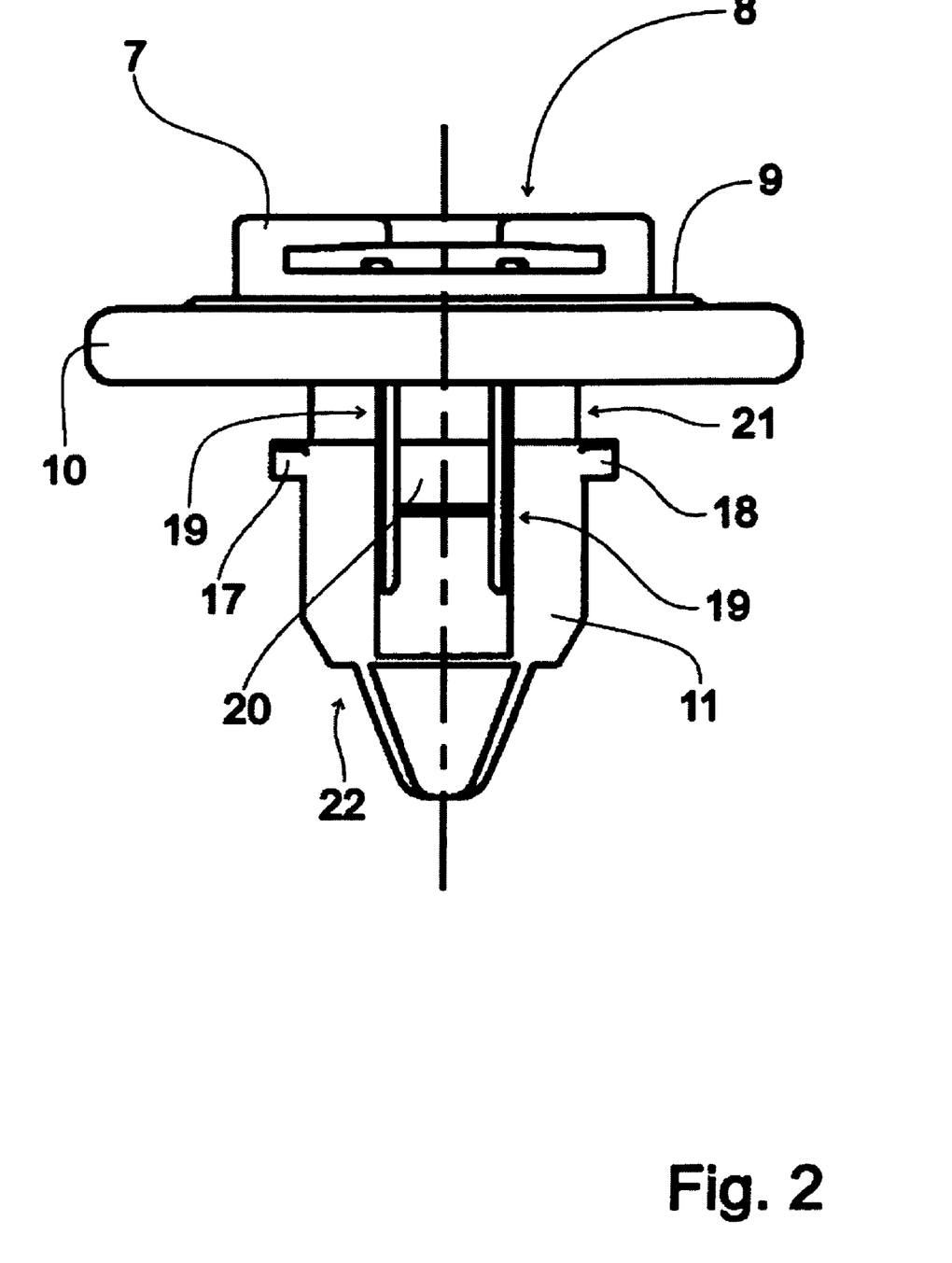
FIG. 2 is a side view of a locking part of the fastening arrangement according to FIG. 1.

FIG. 2 is a side view of the locking part 8 of the exemplary fastening arrangement according to FIG. 1. It is evident from FIG. 2 that radially outwardly projecting bearing tenons 17, 18 are configured on diametrically opposite sides of the foot shaft 11. It can further be seen from FIG. 2 that spring webs 20, 21 are configured between the bearing tenons 17, 18 in the inwardly hollow foot shaft 11 by the formation of axially extending, spaced-apart longitudinal slits 19 and of transverse slits (not shown in FIG. 2) in the region of head plate 9, and are connected to foot shaft 11 in the region of a foot end 22 of foot shaft 11 that faces away from head plate 9. The spring webs 20, 21 thus are resiliently movable in a radial direction relative to foot shaft 11.

Figure 3:
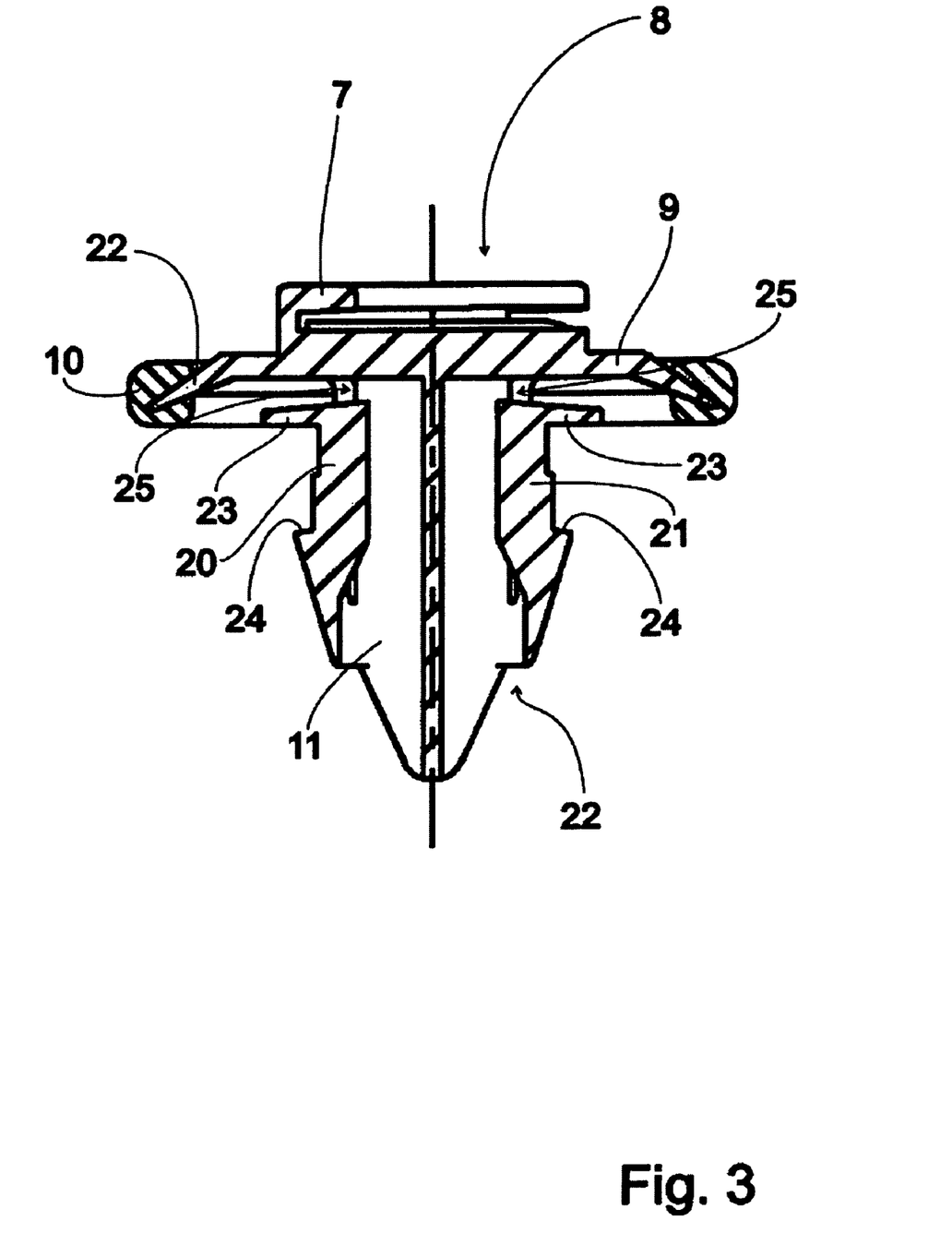
FIG. 3 is a longitudinal section of the locking part according to FIGS. 1 and 2.

FIG. 3 is a longitudinal section of the locking part 8 of the exemplary fastening arrangement according to FIGS. 1 and 2. It is apparent from FIG. 3, for one thing, that formed radially outwardly on head plate 9 is an edge shield 22 which is bent downward in the direction of foot shaft 11 and tapers radially toward the outside, and which is engaged with the sealing lip 10. Sealing lip 10 can thus be moved in the axial direction within certain limits by bending edge shield 22.

It can further be seen from FIG. 3 that each spring web 20, 21 is provided at its end facing toward head plate 9 with radially outwardly extending web wings 23, which project beyond the outside of foot shaft 11. Each spring web 20, 21 also comprises a catch nose 24, which also projects in a radial direction beyond foot shaft 11, and which is configured with a flat side, facing the head plate 9, which in the proper arrangement of locking part 8 engages behind the back side of carrier element 3, i.e., the opposite side from add-on part 2.

Finally, also discernible in FIG. 3 are the transverse slits 25 mentioned in connection with FIG. 2, which are between the head plate 9 and the web wings 23.

Figure 4:
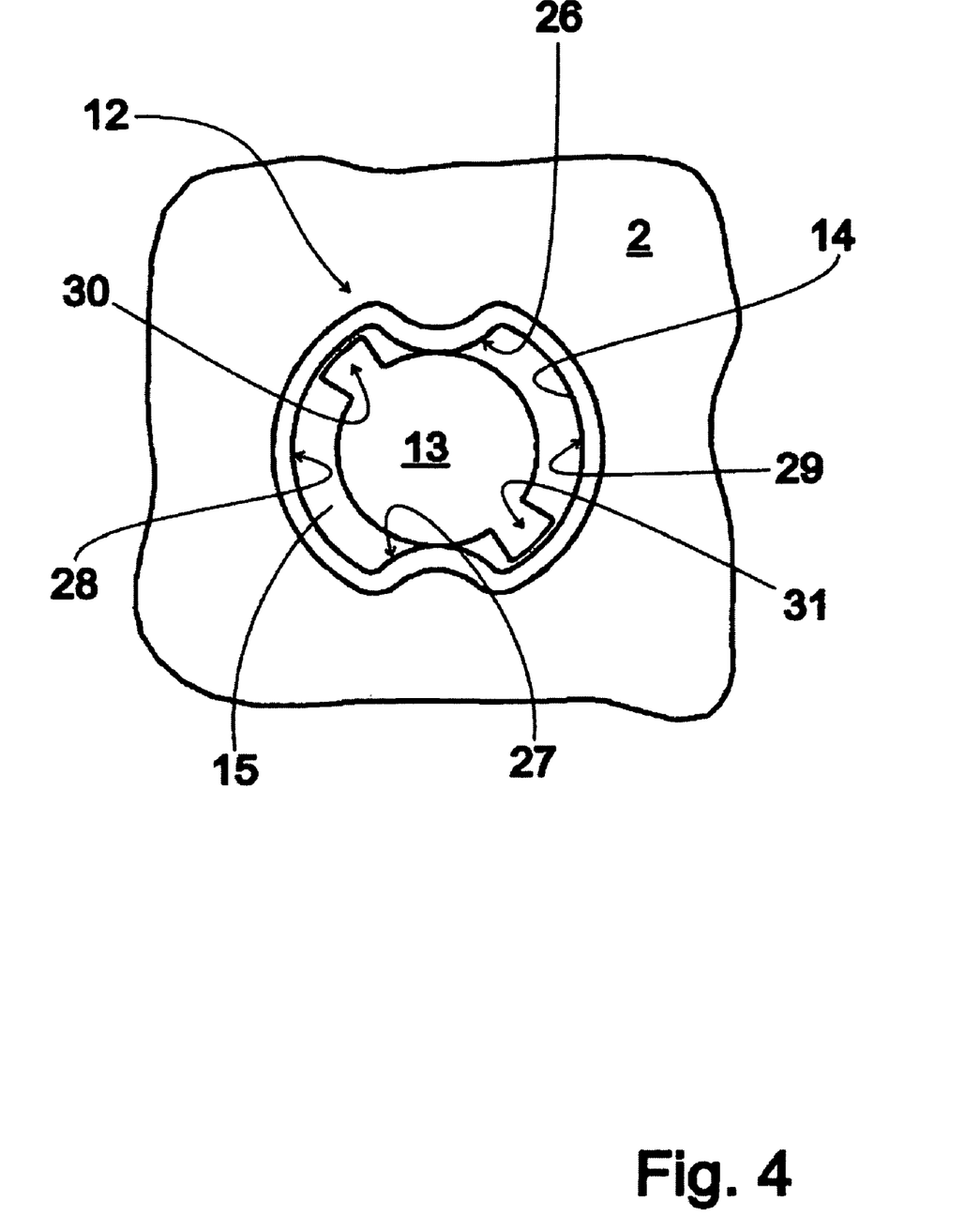
FIG. 4 is a plan view of a receiving element of the fastening arrangement according to FIG. 1, looking in the direction of introduction of the locking part.

FIG. 4 is a plan view of the add-on part 2 on receiving element 12, looking in the insertion direction of locking part 8. It can be seen from FIG. 4 that the edge wall 14 comprises inwardly convex portions 26, 27 that are disposed diametrically opposite each other and bow inward radially, while outwardly concave portions 28, 29 extend between the inwardly convex portions 26, 27 toward the next-following regions of said inwardly convex portions 26, 27. Finally, in the depiction of FIG. 4, configured in bearing surface 15 are diametrically opposite bearing-tenon apertures 30, 31, which are so dimensioned that when locking part 8 is inserted, bearing tenons 17, 18 are able to pass unobstructed through add-on part opening 13, while catch noses 24 slide along the edge of bearing surface 15, deflecting spring webs 20, 21.

Figure 5:
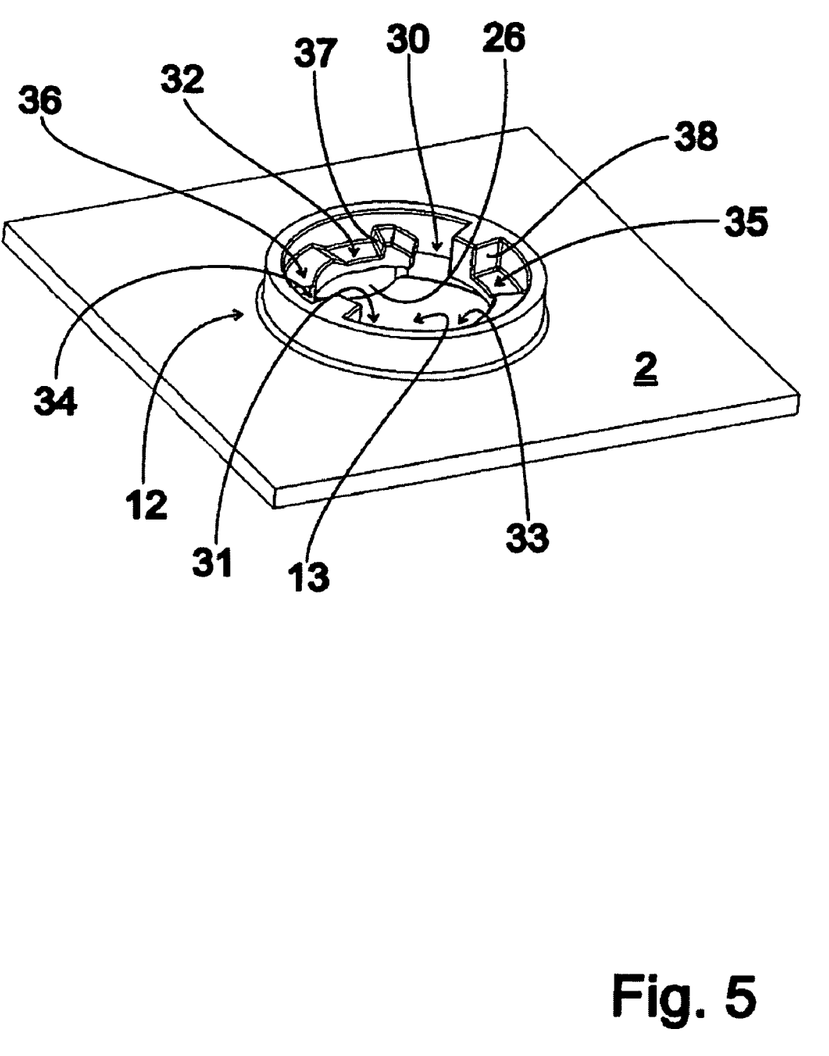
FIG. 5 is a perspective view of the receiving element of the fastening arrangement according to FIGS. 1 to 4, looking at the side of the receiving element that is facing away in the insertion direction of the locking part.

FIG. 5 is a perspective view of the receiving element 12 of the fastening arrangement according to the invention, looking at the side of add-on part 2 that is to the rear in the insertion direction of locking part 8. It can be seen from FIG. 5 that configured on the side of receiving element 12 facing away from bearing surface 15 is a curved path with, adjacent to bearing tenon apertures 30, 31, mounting depressions 32, 33, as first depressions in a direction of rotation, and, as second depressions of a profiled surface 36, demounting depressions 35, 36, spaced for example 90 degrees from mounting depressions 32, 33 in said direction of rotation. Mounting depressions 32, 33 and demounting depressions 34, 35 are configured on their edge sides facing away from each other with abutment walls 37, 38 oriented at right angles to the direction of rotation. By this means, after a single rotation of locking part 8, said locking part 8 is held in receiving element 12 in a loss-proof manner.

Inwardly convex portions 26, 27 are preferably aligned in the axial direction with demounting depressions 34, 35, while outwardly concave portions 28, 29 are aligned in the axial direction with mounting depressions 32, 33. Effective mounting is thus ensured.

The manipulation of the inventive fastening arrangement according to FIG. 1 will be explained below.

After the fastening foot 5 of liner retaining element 4 has been brought into engagement with liner element 1, fastening head 6 is inserted in the receiving head 7 of locking part 8. Locking part 8 is then guided through add-on part opening 13, deflecting the spring webs 20, 21 as described above in connection with FIG. 4, in such a way that bearing tenons 17, 18 pass through bearing-tenon apertures 30, 31. Locking part 8 is then rotated, for example by means of a fork wrench engaged with receiving head 7, such that bearing tenons 17, 18 are disposed in mounting depressions 32, 33 and web wings 23 are positioned in outwardly concave portions 28, 29. In this mounting arrangement, locking part 8 is now pushed, together with add-on part 2, through carrier-part opening 16 until, in this rearwardly engaged arrangement, the catch noses 24 engage, once spring webs 20, 21 have rebounded, behind the side of carrier part 3 facing away from add-on part 2 and elements 1, 2, 3 are henceforth interconnected.

To effect demounting, that is, to separate carrier part 3 from add-on part 2, after the removal of liner retaining element 4, locking part 8 is rotated further such that bearing tenons 17, 18 come to lie in demounting depressions 34, 35. In this demounting arrangement, the catch noses 24 are shifted radially inward so far by the action of inwardly convex portions 26, 27 on web wings 23, accompanied by the inward bending of spring webs 20, 21, that in this releasing arrangement, their rear engagement with carrier element 3 is released and they can therefore pass without engagement through carrier-element opening 16 against the direction of insertion.

To effect remounting, locking part 8 is rotated backwards to return it to the mounted position, in which the bearing tenons 17, 18 lie in the mounting depressions 32, 33 and the catch noses 24 have rebounded.

Figure 6:
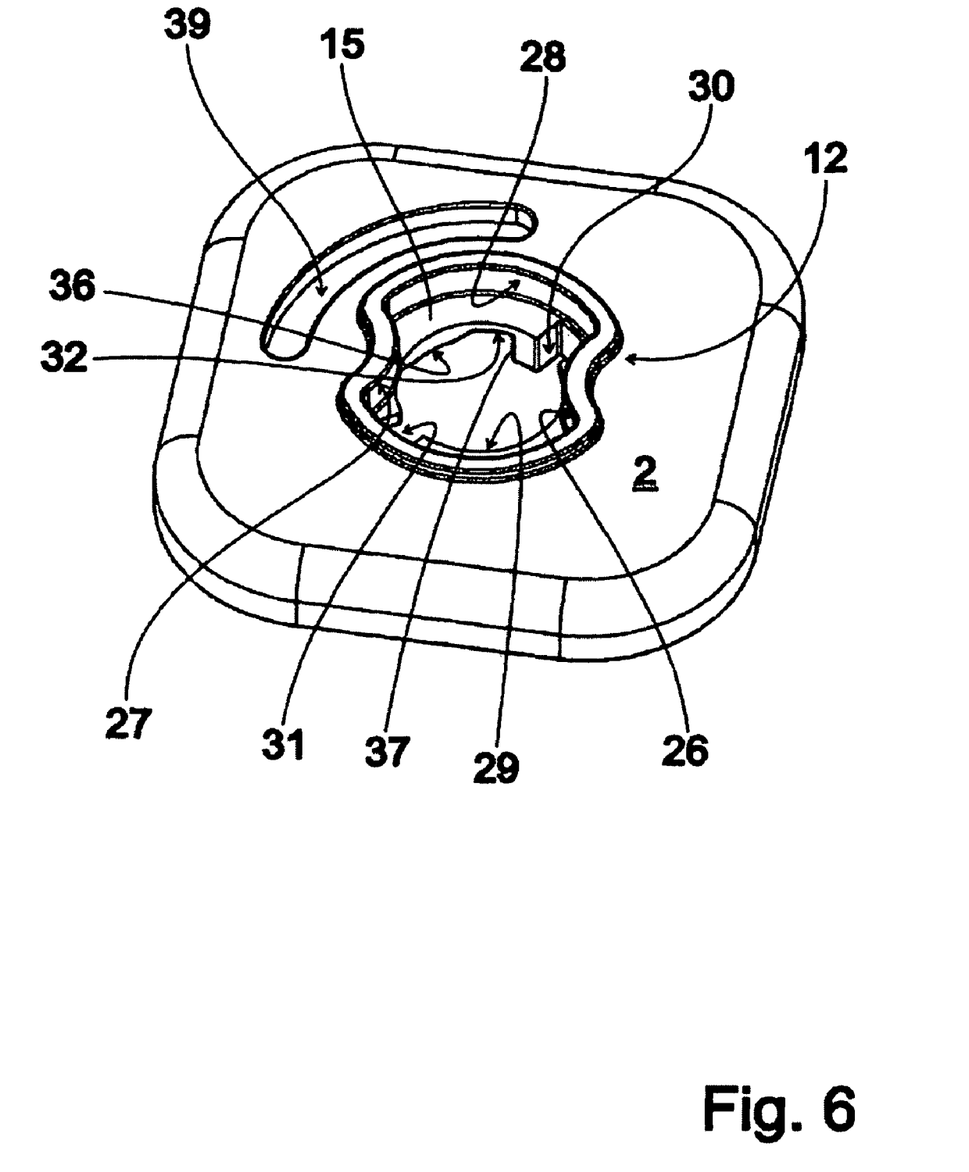
FIG. 6 is a perspective view of another exemplary embodiment of a receiving element of the fastening arrangement according to the invention.

FIG. 6 is a perspective view of another exemplary embodiment of a receiving element 12 of a fastening arrangement according to the invention, it being noted that corresponding elements of the exemplary embodiment according to FIGS. 1 to 5 and of the exemplary embodiment according to FIG. 6 are provided with the same reference characters and will not be described in more detail below. It is apparent from FIG. 6 that the fastening arrangement in this exemplary embodiment is provided with a circular, curved opening 39 extending for substantially 90 degrees, the center point of which lies in the center of receiving element 12 and thus in the center of add-on part opening 13.

Figure 7:
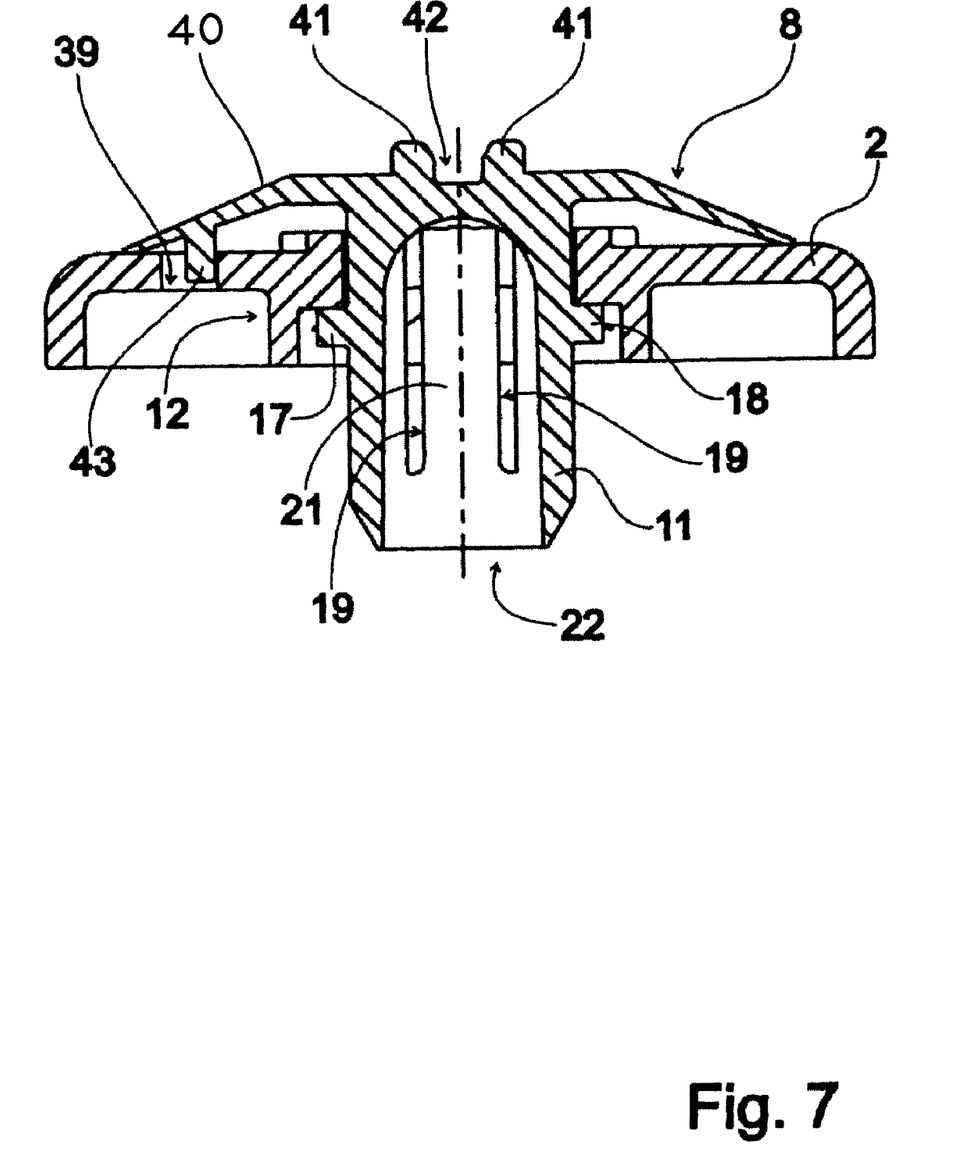
FIG. 7 is a sectional view of the fastening arrangement illustrated in FIG. 6, with a locking part inserted in the receiving element.

FIG. 7 is a sectional view of the of a fastening arrangement illustrated in FIG. 6, with a locking part 8 inserted in the receiving element 12, it being noted that corresponding elements of the exemplary embodiment according to FIGS. 1 to 5 and of the exemplary embodiment according to FIGS. 6 and 7 are provided with the same reference characters and will not be described in more detail below. It can be seen from FIG. 7 that locking part 8 is configured to comprise a covering shield 40 that is open in the direction of foot shaft 11, and in the center region of which are configured two mutually parallel longitudinal ribs 41 directed away from foot shaft 11, which bound a longitudinal slot 42 provided for engagement with the blade of a screwdriver not shown in FIG. 7. Also formed on the covering shield 40, on the side facing toward foot shaft 11, is a guide tenon 43, which in the mounted position shown in FIG. 7 engages in curved opening 39 and thus strikes the terminal edge of curved opening 39 upon reaching the end positions when moving between the demounted position and the mounted position. As a result, during movement between the demounted position and the mounted position, locking part 8 can be guided independently of the interaction of spring webs 20, 21 and receiving element 12, and in a way that provides mechanical relief While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A fastening arrangement for interconnecting at least a first element and a second element, comprising:
a locking part, including a head plate engageable against said first element, and a foot shaft joined to said head plate and extending away from said head plate in an axial direction, said foot shaft including catch noses extending outwardly in a radial direction and engagable behind the second element, and resilient spring webs movable between a radially extended position and a radially retracted position, each said catch nose disposed on an associated spring web, each spring web including a radially outwardly extending web wing adjacent said head plate, and said foot shaft further including radially outwardly projecting bearing tenons;
said first element including a receiving element for said locking part, said receiving element including an edge wall cooperating with said web wings of said spring webs and including inwardly convex portions projecting inwardly in said radial direction, and outwardly concave portions receding outwardly in said radial direction, and profiled surfaces cooperating with said bearing tenons and having first and second depressions extending in said axial direction, said locking part rotatable with respect to said first element between a mounted position and a demounted position,
wherein, in said mounted position of said locking part, said bearing tenons are disposed in said first depressions and said spring webs are in said radially extended position in which said catch noses are engagable behind the second element; and
wherein, in said demounted position of said locking part, said bearing tenons are disposed in said second depressions, and said web wings engage said inwardly convex portions of said edge wall to move said spring webs to said radially retracted position in which said catch noses are shifted inwardly and are out of engagement with the second element.

2. The fastening arrangement of claim 1, wherein said foot shaft is hollow and said spring webs are each formed by two longitudinal slits oriented parallel to each other and by a transverse slit extending transversely to said longitudinal slits.

3. The fastening arrangement of claim 2, wherein said spring webs are connected to said foot shaft proximate a foot end of said foot shaft that faces away from said head plate.

4. The fastening arrangement of claim 1, wherein said inwardly convex portions and said outwardly concave portions are aligned in the axial direction with, respectively, said first depressions and said second depressions.

5. The fastening arrangement of claim 1, wherein said first depressions and said second depressions include, on their edge sides facing away from each other, abutment walls oriented at right angles to a direction of rotation.

6. The fastening arrangement of claim 1, wherein, said bearing tenons are in engagement with said profiled surfaces during movement between said demounted position and said mounted position.

7. The fastening arrangement of claim 1, wherein said receiving element includes a circular edge wall, and said first and second depressions are spaced circumferentially about said circular edge wall.

8. The fastening arrangement of claim 1, wherein said web wings are spaced from said catch noses along said axial direction and are disposed adjacent said head plate.

9. The fastening arrangement of claim 1, wherein said web wings extend from said foot shaft beyond said catch noses along a radial direction perpendicular to said axial direction.

* * * * *